US008496115B2

(12) United States Patent
Pedain

(10) Patent No.: US 8,496,115 B2
(45) Date of Patent: Jul. 30, 2013

(54) FOAMING AGENT AND METHOD FOR FLOATATION OF INSOLUBLE COMPONENTS OF RAW SALTS

(75) Inventor: Klaus-Ulrich Pedain, Dietzenbach-Steinberg (DE)

(73) Assignee: Clariant Finance (BVI) Limited, Tortola (VG)

( * ) Notice: Subject to any disclaimer, the term of this patent is extended or adjusted under 35 U.S.C. 154(b) by 50 days.

(21) Appl. No.: 13/147,977

(22) PCT Filed: Feb. 10, 2010

(86) PCT No.: PCT/EP2010/000814
§ 371 (c)(1),
(2), (4) Date: Aug. 4, 2011

(87) PCT Pub. No.: WO2010/097165
PCT Pub. Date: Sep. 2, 2010

(65) Prior Publication Data
US 2011/0290704 A1 Dec. 1, 2011

(30) Foreign Application Priority Data

Feb. 24, 2009 (DE) .......................... 10 2009 010 293

(51) Int. Cl.
*B03D 1/008* (2006.01)
*B03D 1/02* (2006.01)

(52) U.S. Cl.
USPC .......................................... 209/166; 252/61

(58) Field of Classification Search
USPC ..................................... 209/166, 167; 252/61
See application file for complete search history.

(56) References Cited

U.S. PATENT DOCUMENTS

| | | | | |
|---|---|---|---|---|
| 2,569,672 A | | 10/1951 | Jackson | |
| 2,611,485 A | * | 9/1952 | Tveter | 209/166 |
| 2,695,101 A | * | 11/1954 | Booth et al. | 209/166 |
| 2,724,499 A | | 11/1955 | Smith et al. | |
| 2,923,408 A | * | 2/1960 | Williams | 209/166 |
| 4,192,737 A | * | 3/1980 | Thompson et al. | 209/5 |
| 4,533,465 A | | 8/1985 | Goodman et al. | |
| 4,608,154 A | | 8/1986 | Chan et al. | |
| 4,761,223 A | * | 8/1988 | Klimpel et al. | 209/166 |
| 4,770,767 A | * | 9/1988 | Hansen et al. | 209/166 |
| 5,544,760 A | * | 8/1996 | Benn et al. | 209/166 |
| 6,156,808 A | * | 12/2000 | Chatterji et al. | 516/116 |
| 6,730,292 B1 | * | 5/2004 | Yang et al. | 424/70.11 |
| 2006/0032799 A1 | | 2/2006 | Pedain et al. | |
| 2011/0290705 A1 | | 12/2011 | Pedain et al. | |

FOREIGN PATENT DOCUMENTS

| | | |
|---|---|---|
| DE | 860032 | 3/1951 |
| DE | 1054392 | 12/1954 |
| DE | 1275973 | 4/1967 |
| DE | 149614 | 7/1981 |
| DE | 3441910 | 6/1985 |
| DE | 10217693 | 9/2003 |
| EP | 0408856 | 1/1991 |
| FR | 1068017 | 9/1952 |
| RU | 2237521 C1 * | 10/2004 |
| SU | 595004 A * | 4/1978 |
| SU | 1238799 A * | 6/1986 |
| SU | 1304893 A * | 4/1987 |

OTHER PUBLICATIONS

International Search Report for PCT/EP2010/000814, dated Jun. 24, 2010.
Translation of the Internatonal Preliminary Report on Patentability for PCT/EP2010/000814, dated Jun. 24, 2010.
International Search Report for PCT/EP2010/000815, dated Jul. 28, 2010.
Translation of the Internatonal Preliminary Report on Patentability for PCT/EP2010/000815, dated Jul. 28, 2010.
Helmut Koehler, et al., "Reagent Systems for the Flotation of Soluble Salts", Neue Bergbautechnik, Fachverband Bergbau, DE, Bd. 11, Nr. 6, Jun. 1, 1981, pp. 362-366.
Perry, R.H., et al., Perry's Chemical Engineer's Handbook, 6th Edition, 1984, pp. 21-46-21-51.
Römpp Chemie Online, Version 3.5, "Polypropylenglycole", Mar. 2002.
Kaliverein, e.V., "Kali & Salzstein", No. 3, 2004, p. 1-51.
English Abstract for EP0408856, Jan. 23, 1991.
English Abstract for DD149614, Jul. 22, 1981.
English Abstract for DE1275973, Apr. 5, 1967.
IUPAC, Compendium of Chemical Terminology, $2^{nd}$ ed. (the "Gold Book"), http://goldbook.iupac.org (2006), Aug. 19, 2012.

* cited by examiner

Primary Examiner — Thomas M Lithgow
(74) Attorney, Agent, or Firm — Tod A. Waldrop

(57) ABSTRACT

The invention relates to a method for separating insoluble components from sylvinite, wherein the sylvinite is suspended in a saturated salt brine, a coagulating agent is added to the suspension, and a foaming agent is then added to the composition thus obtained, said foaming agent comprising and ether and/or ester, wherein a) the ethers of formula 1 correspond to R—O—R' (1), where R is a linear or branched alkyl or alkenyl groups having 2 to 30 carbon atoms and R' is a linear or branched alkyl or alkenyl groups having 1 to 30 carbon atoms; b) the esters are derived from monovalent or multivalent alcohols having 1 to 30 carbon atoms (alcohol radicals); or c) the ethers and/or esters are cyclic, wherein the ring size is 6 to 30 carbon atoms.

13 Claims, No Drawings

FOAMING AGENT AND METHOD FOR FLOATATION OF INSOLUBLE COMPONENTS OF RAW SALTS

The invention relates to the flotation of crude potash salts and in particular to a collector and a method for the froth flotation of insoluble parts of sylvinite.

One method for enriching the sylvine from sylvinite is flotation. In this process, the crude salt, after milling and any subsequent electrostatic separation of kieserite, is suspended in a saturated salt lye. This flotation pulp is subsequently conditioned in a conditioning stage with the collector, a primary alkylamine, which is principally used in the form of a hydrochloride, and with a frother, for example with pine oil or methyl isobutyl carbinol. In the subsequent flotation, the hydrophobized KCl is separated from the flotation pulp in the froth phase and obtained as concentrate by skimming off the froth.

Crude potash salts, apart from sylvine (KCl), contain halite (NaCl) and other salts, mostly water-insoluble components, hereinafter also called "clay", which is distributed in the flotation pulp as what is termed "slurry". This has an adverse effect on KCl flotation by significantly increasing the collector consumption, and also reducing the KCl flotation yields and the KCl content in the flotation concentrate. It is therefore customary to remove the clay-like components from the pulp before the sylvine flotation by a wet-mechanical method, such as by a hydrocyclone, and subsequently to passivate residues of the clay which cannot be separated in this manner by adding what is termed a "depressant", in such a manner that the clay is not hydrophobized by the flotation collector and is not enriched in the froth phase. The depressant used is customarily guar, which is obtainable in various types, or carboxymethylcellulose.

This previously described method is very suitable for flotation treatment of sylvinite which has only low clay fractions. At a high clay content, the wet-mechanical separation and the passivation of the clay by adding depressant to the flotation pulp is no longer sufficient in order to prevent the adverse effect thereof on the flotation of the sylvine.

In the prior art, various ways are taken of separating off the insoluble components before the sylvine flotation.

According to DE-3 441 910, the insoluble components are removed from crude potash salts by flotation, using a small addition of a primary or secondary aliphatic amine or of a primary aliphatic ether amine as collector, in combination with a flocculant. In the case of a primary aliphatic amine, the collector can be the same as that used in the subsequent flotation for obtaining KCl from the crude salt.

U.S. Pat. No. 4,192,737 discloses removing the insoluble components from crude potash salts by a flotation method. For this purpose, the crude potash salt is treated with a flocculant which comprises a nonionic or a cationic acrylamide polymer and is subsequently flotated using a nonionic or anionic collector in a mixture with heating oil or with a fatty acid and a de-frother of a glycol ester or polyglycol ester type. The flocculated slurries, however, can also be flotated alone with the fatty acid at a low pH of the flotation pulp.

U.S. Pat. No. 4,533,465 discloses a method for sylvinite flotation in which a synthetic polymer is used as depressant. The synthetic polymer comprises structural units of acrylic acid and acrylamide.

It is an object of the present invention to provide a method for separating off the insoluble components of the sylvinite flotation in which less sylvine is flotated out together with the insoluble components, and sylvinite and insoluble components are, in addition, more effectively separated. It is a further object to find a method for sylvinite flotation in which the insoluble components have less effect on the collector efficiency.

Surprisingly, it has been found that the insoluble components can be flotated by first flocculating them with a nonionic flocculent and then flotating these flocks using a frother, containing certain ethers and/or esters.

The invention therefore relates to a method for separating off insoluble components from sylvinite by suspending the sylvinite in saturated salt lye, adding a flocculant to the suspension, and then adding a frother to the resultant composition, which frother contains at least one ether and/or ester, wherein a) the ethers correspond to formula 1

where R is linear or branched alkyl or alkenyl groups having 2 to 30 carbon atoms and R' is linear or branched alkyl or alkenyl groups having 1 to 30 carbon atoms, b) the esters are derived from monobasic or polybasic carboxylic acids having 2 to 30 carbon atoms (acid radical) and monohydric or polyhydric alcohols having 1 to 30 carbon atoms (alcohol radical), or c) the ethers and/or esters are cyclic, wherein the ring size is from 6 to 30 carbon atoms.

The invention further relates to a method for the flotation of sylvinite, which comprises A) Separating off insoluble components of the sylvinite by suspending the sylvinite in a saturated salt solution, adding a nonionic flocculant to the suspension and then adding a frother to the resultant composition, which frother contains at least one ether and/or ester, wherein a) the ethers correspond to formula 1

where R is linear or branched alkyl or alkenyl groups having 2 to 30 carbon atoms and R' is linear or branched alkyl or alkenyl groups having 1 to 30 carbon atoms, b) the esters are derived from monobasic or polybasic carboxylic acids having 2 to 30 carbon atoms (acid radical) and monohydric or polyhydric alcohols having 1 to 30 carbon atoms (alcohol radical), or c) the ethers and/or esters are cyclic, wherein the ring size is from 6 to 30 carbon atoms, and B) flotation of the sylvine by adding a collector and frother for the sylvinite flotation.

The invention further relates to the use of a composition as frother for a flotation of the insoluble components of sylvinite, wherein the composition contains at least one ether and/or ester, wherein a) the ethers correspond to formula 1

where R is linear or branched alkyl or alkenyl groups having 2 to 30 carbon atoms and R' is linear or branched alkyl or alkenyl groups having 1 to 30 carbon atoms, b) the esters are derived from monobasic or polybasic carboxylic acids having 2 to 30 carbon atoms (acid radical) and monohydric or polyhydric alcohols having 1 to 30 carbon atoms (alcohol radical), or c) the ethers and/or esters are cyclic, wherein the ring size is from 6 to 30 carbon atoms.

The invention further relates to the use of a composition which contains at least one polypropylene glycol and at least one ether and/or ester, wherein a) the ethers correspond to formula 1

where R is linear or branched alkyl or alkenyl groups having 2 to 30 carbon atoms and R' is linear or branched alkyl or alkenyl groups having 1 to 30 carbon atoms, b) the esters are derived from monobasic or polybasic carboxylic acids having 2 to 30 carbon atoms (acid radical) and monohydric or polyhydric alcohols having 1 to 30 carbon atoms (alcohol radical), or c) the ethers and/or esters are cyclic, wherein the ring size is from 6 to 30 carbon atoms.

The method according to the invention and the frother according to the invention will be described in more detail hereinafter.

In a preferred embodiment, a method is provided for the flotation of insoluble parts of a crude potash salt (sylvinite), wherein the crude potash salt is suspended in saturated salt lye, the crude salt pulp is conditioned using the frother according to the invention for insoluble parts, wherein the frother according to the invention for the insoluble components is added in an amount of preferably at least 0.4 g of frother per ton of crude salt, and wherein a suitable flocculant is added in an amount of preferably at least 0.1 g of flocculant per ton of crude salt, the conditioned crude salt pulp is subjected to a froth treatment, and the flotated insoluble parts are removed. In particular, the method comprises, for the flotation of the insoluble parts of crude potash salt, the stages of suspending the crude salt in saturated salt solution, conditioning the crude salt with the frother according to the invention for the insoluble components, which is added in an amount of at least 0.4 g of frother per ton of crude salt, and a suitable flocculant is added in an amount of at least 0.1 g per ton of crude salt, and removing the insoluble parts by flotation of the crude salt pulp.

In addition, a method is provided for the flotation of sylvine from crude potash salts including the use of primary aliphatic amines as collector for sylvine, wherein the amines have a number of carbon atoms in the range from 8 to 24 and are used either as salt of an inorganic acid such as, for example, HCl, or as salt of a carboxylic acid having a number of carbon atoms from 1 to 18 and are used in an amount in the range from 5 to 500 g of collector per ton of crude salt, wherein the method comprises removing the insoluble parts of the crude potash salt before the flotation of the sylvine by froth treatment of the insoluble parts in the presence of the frother according to the invention in an amount in the range from 0.4 to 150 g of frother per ton of crude salt and in the presence of an acrylamide polymer flocculant in an amount of at least 0.1 g of flocculant per ton of crude salt.

The frother according to the invention contains esters, or ethers or esters and ethers as defined above.

"Derived" in the present case is taken to mean that the esters can be obtained by reacting monobasic or polybasic carboxylic acids having 2 to 30 carbon atoms with monohydric or polyhydric alcohols having 1 to 30 carbon atoms.

R and the acid radical are preferably linear or branched alkyl or alkenyl groups having at least 4 carbon atoms, in particular at least 5 to 22 carbon atoms. R' and also the alcohol radical are preferably linear or branched alkyl or alkenyl groups having at least 2 carbon atoms, in particular at least 4 to 22 carbon atoms. The alcohols preferably contain no more OH groups than carbon atoms.

Examples of ethers which may be mentioned are dihexyl ether, dioctyl ether, di-(2-ethylhexyl)ether, examples of esters which may be mentioned are oleic acid eicosyl ester, 2-ethylhexyl stearate, 2-ethylhexylic acid butyrate, octanoic acid ethyl ester, hexanoic acid ethyl ester, 2-ethylhexylic acid butyl ester, 2-ethylhexyl butyrate and 2-ethylhexylic acid 2-ethylhexyl ester.

In a further preferred embodiment of the invention, R and R' or the acid and alcohol radical form a ring having 8 to 22 ring members.

If the frother according to the invention contains esters, the use of mono- and diesters of not only dialcohols but also dicarboxylic acids is preferred. Examples of esters which may be mentioned are adipic acid di(2-ethylhexyl ester), 2-ethylhexane-(1,3)-diol mono-n-butyrate, 2-ethylhexane-(1,3)-diol di-n-butyrate. When dicarboxylic acids or dialcohols are used, the acid or alcohol radicals are alkylene or alkenylene groups.

In a further preferred embodiment, the frother according to the invention, in addition to at least one ether and/or ester, further contains at least one alcohol which carries a hydrocarbon radical of 6 to 16 carbon atoms, and/or at least one polypropylene glycol.

The alcohol preferably corresponds to the formula $R^1(OH)_y$, where $R^1$ is a $O_5$ to $O_{16}$ hydrocarbon group and y is 1, 2, 3, 4, 5 or 6.

Preferably, the alcohol is a monohydric alcohol or a diol. Preferably, the hydrocarbon radical is an alkyl radical or alkylene radical which can be linear or branched. Particularly preferably, the hydrocarbon radical contains 8 to 14 carbon atoms. Particularly preferred alcohols are 2-ethylhexanol and 2-ethylhexane-(1,3)-diol.

In a particularly preferred embodiment of the invention, the frother according to the invention contains alcohol- and ether- and ester-containing mixtures as are formed, for example, as a by-product in oxo synthesis.

In a further preferred embodiment of the invention, a mixture of substances originating from oxo synthesis, hereinafter termed MS, is added as frother component.

MS is a mixture of a number of aliphatic and cyclic, non-aromatic hydrocarbons. The main components of MS can be found in the table below:

| Component | Concentration range (% by wt) |
|---|---|
| Di-2-ethylhexyl ether | 10-25 |
| 2-Ethylhexylic acid 2-ethylhexyl ester | 10-25 |
| $C_{16}$-Lactones | 4-20 |
| 2-Ethylhexyl butyrate | 3-10 |
| 2-Ethylhexane-(1,3)-diol mono-n-butyrate | 5-15 |
| 2-Ethylhexanol | 4-10 |
| $C_4$- to $C_6$ acetates | 2-10 |
| 2-Ethylhexane-(1,3)-diol | 2-5 |
| Ethers and esters > $C_{20}$ | 0-20 |

A further preferred component of the frother according to the invention is polypropylene glycol. In a preferred embodiment, polypropylene glycol is a polypropylene glycol having a number-average molecular weight of 100 to 5000 g/mol, in particular 200 to 2000 g/mol, especially up to 1000 g/mol.

The mixing ratio of ester/ether and optionally alcohol to polypropylene glycol is preferably between 1:10 and 10:1, in particular between 2:1 and 4:1, especially 3:1, by weight. The mixing ratio of ester/ether to alcohol is preferably between 99:1 and 1:99.

The frother according to the invention is preferably used in combination with a suitable flocculant in order to effect the flotation of the insoluble parts. The flocculant can be added before the addition of the frother or together with the frother. Suitable flocculants are, for example, acrylamide polymers. It is possible to use flocculants other than acrylamide polymers which act in a similar manner. The use of acrylamide polymers as flocculant is preferred. The flocculant is added, preferably in an amount of at least 0.1 g/t. The amount of acrylamide polymer-flocculant is preferably added in an amount in the range from 5 to 60 g/t of crude salt, particularly preferably in an amount in the range from 5 to 10 g/t of crude salt. If it is desired, amounts of more than 60 g/t can be used.

The flotation of insoluble parts can be carried in one or two stages, preferably in two sequentially following stages, wherein an amount of frother for insoluble parts is added in the range from 10 to 50 g/t and an amount of acrylamide polymer-flocculant is added in the range from 5 to 10 g/t in the first stage, and an amount of frother for insoluble parts is added in the range from 10 to 20 g/t and an amount of acrylamide polymer-flocculant is added in the range from 5 to 10 g/t in the second stage.

Crude potash salt (potash ore), such as sylvinite, which customarily contains sylvine, halite and, depending on the crude salt, varying amounts of insoluble parts, is comminuted and the comminuted crude salt is fed into a slurrying vessel where saturated salt solution which is customarily recirculated from other sylvinite process steps, is added, in order to produce a salt pulp which is subjected to a purification process in order to release the insoluble components from the crude salt. The crude salt pulp from the purification process is then fed into a conditioning device for the insoluble parts.

The frother according to the invention for the insoluble components is added to the conditioning device. The frother according to the invention is preferably added undiluted. The frother according to the invention, however, can alternatively be added, for example, as a 0.1 to 1% strength aqueous solution. The effective amount of frother which must be added varies with the amount of insoluble parts in the crude salt, and generally the frother according to the invention for the insoluble components will be added to the conditioning device in an amount of at least 0.4 g/t of crude salt. Adding amounts lower than 0.4 g/t leads to a high residual content of insoluble particles remaining in the crude salt, which requires high additions of sylvine collector in the subsequent sylvine flotation. The addition of amounts greater than 150 g/t leads to high sylvine loss in the flotation of the insoluble components. The best results are achieved with amounts of the frother in the range from 20 to 50 g/t of crude salt, preferably with an amount in the range from 20 to 40 g/t of crude salt; the particularly preferred amount is 30 g/t.

It has been found that adding a collector in the flotation of the insoluble components is generally not necessary.

After suitable treatment and conditioning of the crude salt pulp with the frother and the flocculant, the conditioned crude salt pulp is subjected to a froth treatment, whereby the insoluble components are floated as a concentrate and the flotation tailings contain the majority of the sylvine and a remainder of insoluble components.

The flotation tailings from the flotation of the insoluble components are successively admixed with a suitable depressant such as, for example, starch or guar, in order to inactivate the remainder of insoluble components, and are conditioned with a suitable amount of a collector for sylvine and with a suitable amount of a frother for sylvine.

The conditioned flotation tailings are then fed into the KCl flotation circuit and subjected to the flotation for obtaining sylvine.

The sylvine collector, in a preferred embodiment, can be an amine collector.

The amine collector can be selected from the group consisting of aliphatic amines which comprise primary aliphatic amines, secondary aliphatic amines and primary ether aliphatic amines. The primary aliphatic amine collector can be a single compound, but is customarily a mixture of amines that have a number of carbon atoms in the range from 8 to 24.

For example, primary aliphatic amines are suitable for the selective flotation of crude potash salt such as those which are marketed under the trade names Genamin SH 100® and Flotigam V 5070®, which comprise amines having carbon atoms in the range from 12 to 24.

An amount of frother according to the invention for the insoluble components and an amount of a flocculant are added to each conditioning stage. A concentrate of the insoluble components is obtained from each flotation stage. The concentrates of the insoluble components are fed to a thickener and the flotation tailings from the second stage of the flotation of the insoluble components are fed to the sylvinite flotation circuit for separating sylvine from other crude potash salt components.

In the two-stage flotation for the insoluble components according to this preferred exemplary embodiment, cleaned crude salt pulp is conditioned in a first conditioning stage with the frother according to the invention for insoluble components containing an acrylamide polymer flocculant. The conditioned crude salt pulp is subjected to the first stage of froth treatment for removing a first concentrate which contains insoluble components. The flotation tailings from the froth treatment of the first stage are conditioned with a second amount of the frother according to the invention and a second amount of an acrylamide polymer flocculant and the pulp thus conditioned is subjected to the froth treatment of the second stage. A second concentrate of insoluble components is removed and fed to a thickener together with the concentrate of the insoluble components from the first stage of the flotation of insoluble components. The second flotation tailings are fed to the flotation circuit for sylvinite, where sylvine is flotated from other crude potash salt components, using a suitable collector.

EXAMPLES

The sylvinite used for the flotation experiments was already sufficiently comminuted. Some of the sylvinite was dissolved in water at room temperature with constant stirring in order to produce 50 l of a saturated mother liquor. Sufficient salt was added so that a saturated salt solution with sediment was formed. After 24 hours of standing time, the supersaturated solution was filtered off by means of a folded filter. The filtrate was used for the flotation experiments. The mother liquor was stored at a constant temperature in order to avoid precipitation of salt. The sylvinite remaining from the total amount was homogenized and divided into representative samples of 745 g. The samples contained 9.3% by weight of insoluble components. The flotation experiments were carried out using a KHD type flotation machine. For this purpose, the salt was placed in a 3 l plastic cell and made up to the full volume with water. Then, the flotation machine was turned on and the stirrer adjusted to 1600 rpm. After 1 min of conditioning time without reagents, first the flocculant was metered from a 0.1% strength solution and conditioning was performed for 1 min. Then the frother was added undiluted and conditioning was performed for a further one minute. Thereafter the flotation pulp was ventilated by opening the air intake valve on the flotation machine and the froth was skimmed from the surface of the flotation pulp. After 4 min of flotation time, the flotation was terminated. The froth product was filtered off, rinsed with ethanol and dried at 108° C. The chamber product was filtered off, rinsed with ethanol and dried at 108° C. In this manner, the data on the mass of froth and chamber products were obtained. The fraction of insoluble components was determined by dissolving a representative sample of the froth product and the chamber product in deionized water. After subsequent filtration of the solution and drying of the filter cake at 108° C., the residue was weighed on an analytic balance. The percentage fraction of the insoluble components results from the masses of the insoluble components and the masses of froth product and chamber product.

The output of insoluble components in % is given by the ratio of the mass of the insoluble components of the froth product to the mass of the insoluble components of the entire flotation output.

The valuable mineral sylvine is situated in the chamber product. A result is desired in which the fraction of insoluble components in the froth product and the output of insoluble components are simultaneously as large as possible.

Under these experimental conditions, the following results were obtained.

TABLE 1

Composition of the frothers S1-S7

| Component | % by weight in | | | | | | |
|---|---|---|---|---|---|---|---|
|  | S1 | S2 | S3 | S4 | S5 | S6 | S7 |
| polypropylene glycol 200 g/mol | 75 | 75 | 75 | 75 | 75 | 75 | 0 |
| Di-2-ethylhexyl ether | 4.1 | 25 | 0 | 12.5 | 10 | 10 | 16 |
| 2-ethylhexylic acid 2-ethylhexyl ester | 4.3 | 0 | 0 | 0 | 0 | 0 | 17 |
| $C_{16}$ lactones | 3.5 | 0 | 0 | 0 | 0 | 0 | 14 |
| 2-ethylhexyl butyrate | 1.1 | 0 | 25 | 12.5 | 10 | 10 | 5 |
| 2-ethylhexane-(1,3)-diol mono-h-butyrate | 2.6 | 0 | 0 | 0 | 0 | 0 | 11 |
| 2-ethylhexanol | 1.2 | 0 | 0 | 0 | 5 | 0 | 5 |
| $C_4$ to $C_6$ acetates | 0.7 | 0 | 0 | 0 | 0 | 0 | 3 |
| 2-ethylhexane-(1,3)-diol | 1.1 | 0 | 0 | 0 | 0 | 5 | 4 |
| ethers and esters >$C_{20}$ | 2.3 | 0 | 0 | 0 | 0 | 0 | 9 |
| others | 4.1 | 0 | 0 | 0 | 0 | 0 | 16 |

CS1 is a comparison collector, CS2 is a comparison frother. In the experiment using CS1, the valuable mineral sylvine occurs as froth product, in the experiments using CS2, as chamber product. IC froth product and output, when CS1 is used, are in every case worse than in the method according to the invention. Comparative experiment 12(C) should be compared with example 2 according to the invention, comparative experiment 13(C) should be compared with example 4 according to the invention. It becomes clear that the examples according to the invention have clearly improved fractions of insoluble components in the froth product and output compared with the comparative examples.

The invention claimed is:

1. A method for separating off insoluble components from sylvinite comprising the steps of suspending the sylvinite in saturated salt lye, adding a flocculant to the suspension, and subsequently adding a frother to the resultant suspension composition, wherein the frother comprises at least one polypropylene glycol and at least one ether or ester, wherein
   a) the at least one ether corresponds to formula 1

$$R\text{—}O\text{—}R' \qquad (1)$$

wherein R is linear or branched alkyl or alkenyl groups having 2 to 30 carbon atoms and R' is linear or branched alkyl or alkenyl groups having 1 to 30 carbon atoms,
   b) the at least one ester is derived from monobasic or polybasic carboxylic acids having 2 to 30 carbon atoms and monohydric or polyhydric alcohols having 1 to 30 carbon atoms, or
   c) the at least one ether or ester are cyclic, wherein the ring size is from 6 to 30 carbon atoms.

2. The method as claimed in claim 1, wherein the at least one polypropylene glycol has a number-average molecular weight of 100 to 5000 g/mol.

3. The method as claimed in claim 1, wherein the radicals R and/or the acid radical comprise 4 to 22 carbon atoms and the radicals R' and/or the alcohol radical comprise 2 to 22 carbon atoms.

TABLE 2

Results of the flotation experiments

| | Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13(C) | 14(C) |
| Frother | S1 | S1 | S1 | S1 | S1 | S2 | S3 | S4 | S5 | S6 | S7 | CS1 | CS2 | CS2 |
| Amount of frother (g/t) | 10 | 30 | 50 | 50 | 50 | 30 | 50 | 70 | 100 | 150 | 50 | 30 | 30 | 50 |
| Amount of flocculant (g/t) | 7 | 7 | 7 | 1 | 50 | 10 | 10 | 10 | 10 | 10 | 7 | 7 | 7 | |
| Mass of froth product (g) | 50.1 | 61.4 | 78.0 | 50.4 | 223.0 | 70.6 | 73.8 | 81.9 | 119.2 | 218.2 | 57.8 | 71.6 | 51.9 | 44.7 |
| Mass of chamber product (g) | 694.9 | 683.6 | 667.0 | 694.6 | 522.0 | 674.5 | 671.2 | 663.1 | 625.8 | 526.8 | 687.2 | 673.4 | 693.1 | 700.3 |
| IC froth product (% by wt.) | 31.5 | 78.3 | 63.2 | 34.1 | 20.3 | 72.4 | 67.5 | 60.3 | 40.8 | 22.1 | 71.1 | 18.7 | 69.4 | 32.8 |
| IC chamber product (% by wt.) | 7.7 | 3.1 | 3.0 | 7.5 | 4.6 | 2.7 | 2.9 | 3 | 3.3 | 4 | 4.1 | 8.3 | 4.8 | 7.8 |
| Output IC (%) | 22.7 | 69.4 | 71.1 | 24.8 | 65.3 | 73.7 | 71.9 | 71.3 | 70.2 | 69.6 | 59.3 | 19.3 | 52.0 | 21.2 |

IC = insoluble component
CS1 = comparison collector (hydrogenated tallow fatty amine)
CS2 = comparison frother (pine oil)
flocculent = Hengfloc ® 70014, a nonionic polyacrylamide In table 2, flotation experiments with the frother according to the invention are compared with those experiments which were carried out using collectors and frothers of the prior art.

4. The method as claimed in claim 1, where R and R' or the acid radical and the alcohol radical form a ring having 8 to 22 ring members.

5. The method as claimed in claim 1, where the at least one ether or ester are selected from the group consisting of dihexyl ether, dioctyl ether, di-(2-ethylhexyl)ether, oleic acid eicosyl ester, 2-ethylhexyl stearate, 2-ethylhexylic acid butyrate, octanoic acid ethyl ester, hexanoic acid ethyl ester, 2-ethylhexylic acid butyl ester, 2-ethylhexyl butyrate and 2-ethylhexylic acid 2-ethylhexyl ester, adipic acid di(2-ethylhexyl ester), 2-ethylhexane-(1,3)-diol mono-n-butyrate, and 2-ethylhexane-(1,3)-diol di-n-butyrate.

6. The method as claimed in claim 1, wherein the frother further comprises at least one alcohol which has a hydrocarbon radical of 6 to 16 carbon atoms.

7. The method as claimed in claim 6, wherein the alcohol is a monohydric or dihydric alcohol.

8. The method as claimed in claim 1, wherein the mixing ratio of ester/ether and optionally alcohol to polypropylene glycol is between 1:10 and 10:1 by weight.

9. The method as claimed in claim 1, wherein MS is used, and where MS corresponds to the composition

| Component | Concentration range (% by wt) |
|---|---|
| Di-2-ethylhexyl ether | 10-25 |
| 2-Ethylhexylic acid 2-ethylhexyl ester | 10-25 |
| $C_{16}$-Lactones | 4-20 |
| 2-Ethylhexyl butyrate | 3-10 |
| 2-Ethylhexane-(1,3)-diol mono-n-butyrate | 5-15 |
| 2-Ethylhexanol | 4-10 |
| $C_4$- to $C_6$ acetates | 2-10 |
| 2-Ethylhexane-(1,3)-diol | 2-5 |
| Ethers and esters > $C_{20}$ | 0-20. |

10. The method as claimed in claim 1, wherein the flocculant is selected from the group consisting of acrylamide polymers.

11. The method as claimed in claim 1, wherein the frother is applied in an amount of 0.4 to 150 g/ton of crude salt.

12. The method as claimed in claim 1, wherein the flocculant is applied in an amount of 0.1 to 100 g/ton of crude salt.

13. The method for the flotation of sylvinite, which comprises the steps of
   A) separating off insoluble components from sylvinite as claimed in claim 1, and
   B) flotation of the sylvine by adding a collector and frother for the sylvinite flotation.

* * * * *